(12) United States Patent
Nakagawa et al.

(10) Patent No.: US 10,981,053 B2
(45) Date of Patent: Apr. 20, 2021

(54) VIBRATION CONTROL APPARATUS

(71) Applicant: Sony Interactive Entertainment Inc., Tokyo (JP)

(72) Inventors: Yusuke Nakagawa, Kanagawa (JP); Ikuo Yamano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/500,655

(22) PCT Filed: Sep. 20, 2017

(86) PCT No.: PCT/JP2017/033925
§ 371 (c)(1),
(2) Date: Oct. 3, 2019

(87) PCT Pub. No.: WO2018/193650
PCT Pub. Date: Oct. 25, 2018

(65) Prior Publication Data
US 2020/0061459 A1 Feb. 27, 2020

(30) Foreign Application Priority Data

Apr. 18, 2017 (WO) .................. PCT/JP2017/015564

(51) Int. Cl.
| | | |
|---|---|---|
| *A63F 13/00* | (2014.01) | |
| *A63F 13/285* | (2014.01) | |
| *A63F 13/215* | (2014.01) | |
| *A63F 13/424* | (2014.01) | |
| *G06F 3/01* | (2006.01) | |
| *G06F 3/16* | (2006.01) | |

(52) U.S. Cl.
CPC .......... *A63F 13/285* (2014.09); *A63F 13/215* (2014.09); *A63F 13/424* (2014.09); *G06F 3/016* (2013.01); *G06F 3/16* (2013.01); *G06F 2203/015* (2013.01)

(58) Field of Classification Search
None
See application file for complete search history.

(56) References Cited

U.S. PATENT DOCUMENTS

| | | |
|---|---|---|
| 5,889,670 A | 3/1999 | Schuler |
| 6,766,299 B1 | 7/2004 | Bellomo |
| 6,864,877 B2 | 3/2005 | Braun |

(Continued)

FOREIGN PATENT DOCUMENTS

| | | |
|---|---|---|
| EP | 0999518 A1 | 5/2000 |
| JP | 0884858 A | 4/1996 |

(Continued)

OTHER PUBLICATIONS

International Search Report for related PCT Application No. PCT/JP2017/044072, 4 pages, dated Jan. 16, 2018.

(Continued)

*Primary Examiner* — Paul A D'Agostino
(74) *Attorney, Agent, or Firm* — Matthew B. Dernier, Esq.

(57) ABSTRACT

This vibration control apparatus receives a vibration instruction for vibrating a vibration device and vibrates the vibration device according to contents in which contents of the received vibration instruction are corrected in accordance with information regarding an operating condition of the vibration device.

12 Claims, 4 Drawing Sheets

(56) References Cited

U.S. PATENT DOCUMENTS

| | | |
|---|---|---|
| 7,010,488 B2 | 3/2006 | van Santen |
| 7,218,310 B2 | 5/2007 | Goldenberg |
| 8,248,218 B2 | 8/2012 | Yamaya |
| 8,249,276 B2 | 8/2012 | Hamada |
| 8,325,144 B1 | 12/2012 | Tierling |
| 8,487,759 B2 | 7/2013 | Hill |
| 8,727,878 B2 | 5/2014 | Longdale |
| 8,787,586 B2 | 7/2014 | Hamada |
| 9,007,445 B2 | 4/2015 | Oikawa |
| 9,070,282 B2 | 6/2015 | Clough |
| 9,098,984 B2 | 8/2015 | Heubel |
| 9,135,791 B2 | 9/2015 | Nakamura |
| 9,430,700 B2 | 8/2016 | Yagcioglu |
| 9,436,280 B2 | 9/2016 | Tartz |
| 9,542,745 B2 | 1/2017 | Moteki |
| 9,630,098 B2 | 4/2017 | Mikhailov |
| 9,753,537 B2 | 9/2017 | Obana |
| 9,792,501 B1 | 10/2017 | Maheriya |
| 9,846,484 B2 | 12/2017 | Shah |
| 9,940,716 B2 | 4/2018 | Chevassus |
| 9,946,347 B2 | 4/2018 | Nakagawa |
| 9,952,670 B2 | 4/2018 | Watanabe |
| 9,983,671 B2 | 5/2018 | Adachi |
| 10,109,161 B2 | 10/2018 | Shah |
| 10,150,029 B2 * | 12/2018 | Yamano .......... H04R 1/26 |
| 10,175,761 B2 | 1/2019 | Cruz-Hernandez |
| 10,347,093 B2 | 7/2019 | Rihn |
| 10,394,326 B2 | 8/2019 | Ono |
| 10,444,837 B2 | 10/2019 | Takeda |
| 2002/0030663 A1 | 3/2002 | Goldenberg |
| 2002/0080112 A1 | 6/2002 | Braun |
| 2002/0163498 A1 | 11/2002 | Chang |
| 2003/0030619 A1 | 2/2003 | Martin |
| 2003/0212555 A1 | 11/2003 | van Santen |
| 2004/0220812 A1 | 11/2004 | Bellomo |
| 2005/0134562 A1 | 6/2005 | Grant |
| 2007/0091063 A1 | 4/2007 | Nakamura |
| 2007/0248235 A1 | 10/2007 | Hamada |
| 2008/0204266 A1 | 8/2008 | Malmberg |
| 2008/0262658 A1 | 10/2008 | Ding |
| 2009/0017911 A1 | 1/2009 | Miyazaki |
| 2010/0016077 A1 | 1/2010 | Longdale |
| 2010/0085462 A1 | 4/2010 | Sako |
| 2010/0090815 A1 | 4/2010 | Yamaya |
| 2010/0091096 A1 | 4/2010 | Oikawa |
| 2010/0245237 A1 | 9/2010 | Nakamura |
| 2011/0039606 A1 | 2/2011 | Kim |
| 2011/0075835 A1 | 3/2011 | Hill |
| 2011/0163946 A1 * | 7/2011 | Tartz .......... G06F 3/016 |
| | | 345/156 |
| 2012/0232780 A1 | 9/2012 | Delson |
| 2012/0281849 A1 | 11/2012 | Hamada |
| 2013/0057509 A1 | 3/2013 | Cruz-Hernandez |
| 2013/0250502 A1 | 9/2013 | Tossavainen |
| 2013/0261811 A1 | 10/2013 | Yagi |
| 2014/0169795 A1 | 6/2014 | Clough |
| 2014/0176415 A1 | 6/2014 | Buuck |
| 2014/0212000 A1 | 7/2014 | Yagcioglu |
| 2014/0220520 A1 | 8/2014 | Salamini |
| 2014/0266644 A1 | 9/2014 | Heubel |
| 2014/0361956 A1 | 12/2014 | Mikhailov |
| 2015/0042484 A1 * | 2/2015 | Bansal .......... G08B 29/00 |
| | | 340/693.3 |
| 2015/0059086 A1 | 3/2015 | Clough |
| 2015/0070261 A1 | 3/2015 | Saboune |
| 2015/0243016 A1 | 8/2015 | Moteki |
| 2015/0273322 A1 | 10/2015 | Nakagawa |
| 2015/0297990 A1 | 10/2015 | Mahlmeister |
| 2015/0302854 A1 | 10/2015 | Clough |
| 2015/0323996 A1 | 11/2015 | Obana |
| 2015/0339819 A1 | 11/2015 | Chevassus |
| 2016/0012687 A1 | 1/2016 | Obana |
| 2016/0054797 A1 | 2/2016 | Tokubo |
| 2016/0124707 A1 | 5/2016 | Ermilov |
| 2016/0132117 A1 | 5/2016 | Adachi |
| 2016/0162025 A1 | 6/2016 | Shah |
| 2016/0214007 A1 | 7/2016 | Yamashita |
| 2016/0310844 A1 | 10/2016 | Yamashita |
| 2016/0342213 A1 | 11/2016 | Endo |
| 2017/0038841 A1 | 2/2017 | Takeda |
| 2017/0045991 A1 | 2/2017 | Watanabe |
| 2017/0053502 A1 | 2/2017 | Shah |
| 2017/0061784 A1 | 3/2017 | Clough |
| 2017/0092084 A1 * | 3/2017 | Rihn .......... G08B 6/00 |
| 2017/0097681 A1 | 4/2017 | Ono |
| 2017/0205883 A1 * | 7/2017 | Tanaka .......... G06F 3/016 |
| 2017/0235364 A1 | 8/2017 | Nakamura |
| 2017/0242486 A1 | 8/2017 | Grant |
| 2018/0067313 A1 | 3/2018 | Sako |
| 2018/0098583 A1 | 4/2018 | Keller |
| 2018/0203509 A1 | 7/2018 | Yamano |
| 2019/0105563 A1 * | 4/2019 | Yamano .......... A63F 13/92 |
| 2019/0332174 A1 | 10/2019 | Nakagawa |
| 2019/0334426 A1 | 10/2019 | Culbertson |
| 2019/0369730 A1 | 12/2019 | Marchant |
| 2020/0225755 A1 | 7/2020 | Lee |
| 2020/0359687 A1 | 11/2020 | Scatterday |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |
| JP | 2010092436 A | 4/2010 |
| JP | 2011501296 A | 1/2011 |
| JP | 2011183374 A | 9/2011 |
| JP | 2012103852 A | 5/2012 |
| JP | 2012226482 A | 11/2012 |
| JP | 2013507059 A | 2/2013 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015513143 A | 4/2015 |
| JP | 2015118605 A | 6/2015 |
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |
| WO | 2015151380 A1 | 10/2015 |

(56) References Cited

FOREIGN PATENT DOCUMENTS

| WO | 2016038953 A1 | 3/2016 |
|---|---|---|
| WO | 2016186041 A1 | 11/2016 |
| WO | 2017043610 A1 | 3/2017 |

OTHER PUBLICATIONS

International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for corresponding PCT Application No. PCTJP2017044074, 12 pages, dated Jun. 18, 2019.
International Search Report for corresponding PCT Application No. PCT/JP2017/044074, 4 pages, dated Jan. 16, 2018.
International Search Report for corresponding PCT Application No. PCT/JP2017/015563, 2 pages, dated Jun. 13, 2017.
International Search Report for corresponding PCT Application No. PCT/JP2017/033925, 4 pages, dated Nov. 7, 2017.
International Search Report for corresponding PCT Application No. PCT/JP2017/015740, 4 pages, dated Jul. 4, 2017.
International Search Report for corresponding PCT Application No. PCT/JP2017/016552, 2 pages, dated Jun. 20, 2017.
International Preliminary Report on Patentability and Written Opinion for corresponding PCT Application No. PCTJP2017044075, 15 pages, dated Jun. 27, 2019.
Notice of Reasons for Refusal for corresponding JP Application No. 2019513214, 12 pages, dated Apr. 28, 2020.
International Preliminary Report on Patentability and Written Opinion for related application PCT/JP2017/016552, 13 pages, dated Nov. 7, 2019.
International Search Report for related application PCT/JP2018/026551, 4 pages, dated Aug. 7, 2018.
Office Action for related U.S Appl. No. 16/345,071, 10 pages, dated Feb. 19, 2020.
International Search Report for related PCT Application No. PCT/JP2017/030344, 4 pages, dated Oct. 10, 2017.
International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Office Action for related U.S. Appl. No. 16/500,651, 7 pages, dated Apr. 16, 2020.
International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
Notice of Reasons for Refusal for corresponding JP Application No. 2019-537506, 4 pages dated Nov. 18, 2020.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.

\* cited by examiner

VIBRATION CONTROL APPARATUS

TECHNICAL FIELD

The present invention relates to a vibration control apparatus that controls a vibration device that presents vibration to a user, a control method for the vibration device, and a control program.

BACKGROUND ART

Like an operation device or the like used in connection with a home video game machine, some devices used while worn or held on his/her own body by a user include a vibration mechanism for vibrating a part or all of the device. A vibration device including the above vibration mechanism operates the vibration mechanism at arbitrary timing to thereby present vibration to the user.

SUMMARY

Technical Problem

In the vibration device in a technique of a conventional example, a vibration characteristic thereof changes depending on an operating condition. Therefore, even if the same control signal is input to the vibration device, variations occur in vibration felt by a user depending on the condition.

The present invention has been made in view of the above circumstances. An object of the present invention is therefore to provide a vibration control apparatus capable of suppressing variations of a vibration characteristic depending on an operating condition of a vibration device, a control method for the vibration device, and a control program.

Solution to Problem

A vibration control apparatus according to the present invention is a vibration control apparatus that vibrates a vibration device, including an acquisition section configured to acquire information regarding an operating condition of the vibration device, a vibration instruction reception section configured to receive a vibration instruction, and a vibration control section configured to vibrate the vibration device according to contents in which contents of the received vibration instruction are corrected in accordance with the information regarding the operating condition.

A control method for a vibration device according to the present invention includes a step of acquiring information regarding an operating condition of the vibration device, a step of receiving a vibration instruction, and a step of vibrating the vibration device according to contents in which contents of the received vibration instruction are corrected in accordance with information regarding the operating condition.

A program according to the present invention is a program for controlling a vibration device, the program causing a computer to function as an acquisition section configured to acquire information regarding an operating condition of the vibration device, a vibration instruction reception section configured to receive a vibration instruction, and a vibration control section configured to vibrate the vibration device according to contents in which contents of the received vibration instruction are corrected in accordance with information regarding the operating condition. The program may be stored in a computer readable non-transitory information storage medium for provision.

DESCRIPTION OF EMBODIMENT

Figure 1:
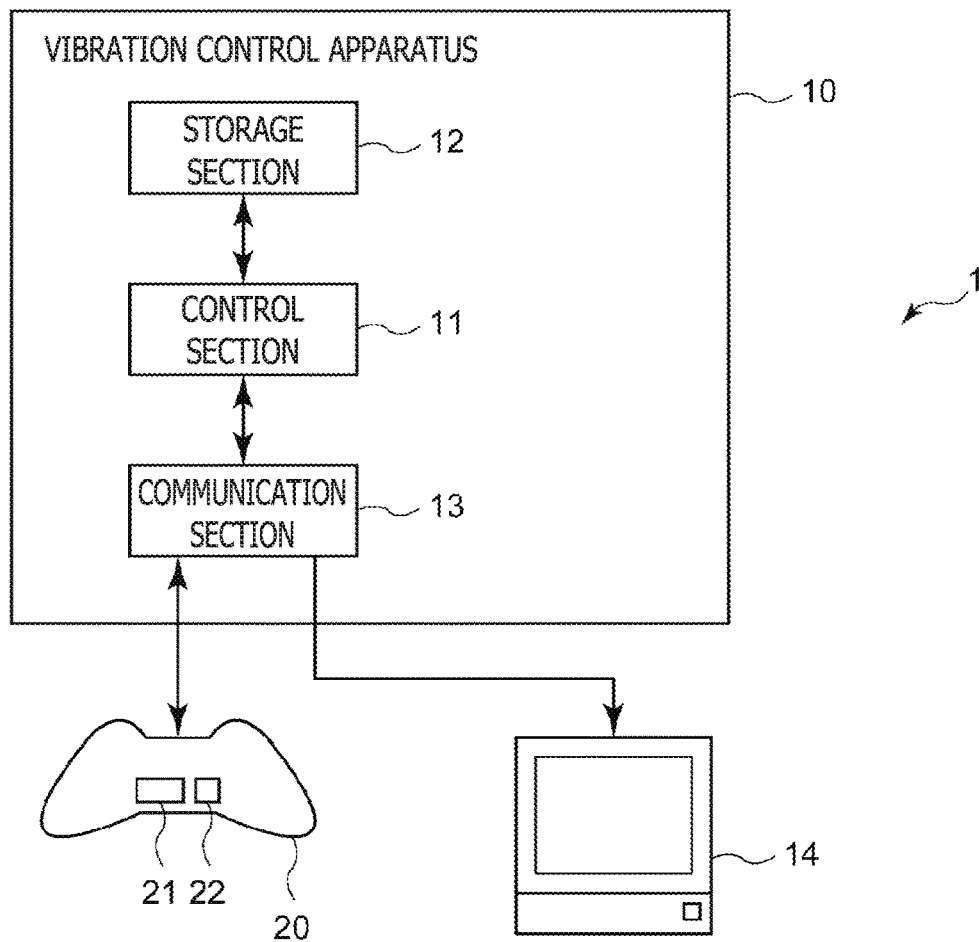
FIG. 1 is a block diagram illustrating a configuration example of a vibration control system including a vibration control apparatus according to an embodiment of the present invention.

Hereinafter, preferred embodiment of the present invention will be described with reference to the appended drawings.

A vibration control system 1 according to one example of an embodiment of the present invention includes a vibration control apparatus 10 and a vibration device 20 connected to the vibration control apparatus 10.

The vibration device 20 is a device used when held with hands by a user or when worn on a body of the user. The vibration device 20 houses a vibration mechanism 21 and vibration is presented to the user by operating the vibration mechanism 21. The vibration mechanism 21 may be various vibration generating devices such as a linear resonant actuator, a voice coil motor, or an eccentric motor. In addition, the vibration device 20 may include various operating members such as a manual operation button or lever used as an operation object by the user.

In the present embodiment, the vibration device 20 further includes one or a plurality of sensors 22. The above sensors 22 acquire information indicating an operating condition of the vibration device 20 and transmits results thereof to the vibration control apparatus 10. Specifically, the sensors 22 are assumed to include a motion sensor such as an acceleration sensor that detects a motion of the vibration device 20. In addition, the sensor 22 may include a microphone that collects ambient voices. Further, the sensors 22 may include a temperature sensor that measures a temperature within a chassis of the vibration device 20.

The vibration control apparatus 10 may be information processing equipment communicatively connected to the vibration device 20 and may be, for example, a home video game machine, a personal computer, or the like. In the present embodiment, the vibration control apparatus 10 is communicatively connected also to a display apparatus 14. As illustrated in FIG. 1, the vibration control apparatus 10 includes a control section 11, a storage section 12, and a communication section 13.

The control section 11 includes a program control device such as a central processing unit (CPU) and executes various information processings in accordance with programs stored in the storage section 12. Contents of specific processings of the control section 11 will be described in detail below.

The storage section 12 is a memory device or the like and holds programs executed by the control section 11. The program may be a program that is stored in a computer-readable non-transitory storage medium for provision and is duplicated in the storage section 12. Also, the storage section 12 operates as a work memory of the control section 11.

The communication section 13 includes a serial interface such as a universal serial bus (USB) or a wireless communication interface such as a Bluetooth (registered trademark). The vibration control apparatus 10 is communicably connected to the vibration device 20 via the communication section 13. Particularly, in the present embodiment, the communication section 13 transmits a control signal for operating the vibration mechanism 21 in accordance with an instruction from the control section 11. Further, the communication section 13 includes a communication interface for communicating with the display apparatus 14 by wire or wireless. The vibration control apparatus 10 transmits data of videos to be displayed by the display apparatus 14 to the display apparatus 14 via the communication section 13.

The display apparatus 14 displays videos based on video signals transmitted by the vibration control apparatus 10. For example, the display apparatus 14 may be a device of a type used while worn on the head by the user, such as a head-mounted display.

Figure 2:
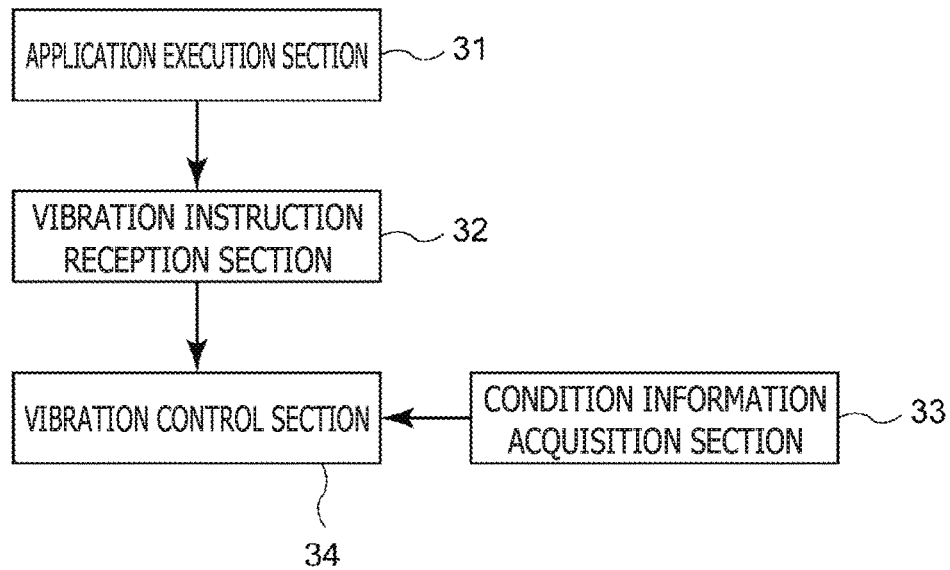
FIG. 2 is a functional block diagram illustrating functions of the vibration control apparatus according to the embodiment of the present invention.

Hereinafter, operations of the control section 11 of the vibration control apparatus 10 will be described. As exemplified in FIG. 2, in the present embodiment, the control section 11 functionally includes an application execution section 31, a vibration instruction reception section 32, a condition information acquisition section 33, and a vibration control section 34. The control section 11 operates in accordance with the programs stored in the storage section 12, and thereby the above functions are implemented. The program may be provided to the vibration control apparatus 10 through a communication network such as the Internet. Alternatively, the program may be stored in a computer readable information storage medium such as an optical disk for provision.

The control section 11 executes the application program of a game etc. and thereby the application execution section 31 is implemented. The application execution section 31 executes various processings in accordance with operation contents or the like of the user for the vibration device 20 and causes the display apparatus 14 to display processing results thereof on a screen. The application execution section 31 may construct a virtual space in which various virtual objects are arranged and present an image indicating an appearance of the inside to the user, for example.

Further, the application execution section 31 outputs vibration instruction data for vibrating the vibration device 20 in accordance with processing contents thereof. The vibration instruction data includes data for instructing how the vibration mechanism 21 of the vibration device 20 is vibrated. For example, the vibration instruction data may include data in which a waveform of vibration to be generated by the vibration mechanism 21 is encoded. In this case, an actual operation mode of the vibration mechanism 21 is regulated by amplitude and frequency of the waveform. The above vibration instruction data may be described by a format having a resemblance to voice data. Further, it is assumed that the vibration instruction data includes waveforms on which vibrations of a plurality of frequencies are superimposed similarly to the voice data. The vibration instruction data output by the application execution section 31 is stored in a buffer area secured within the storage section 12.

The vibration instruction reception section 32 receives a vibration instruction for vibrating the vibration device 20 from the application execution section 31. Specifically, the application execution section 31 subsequentially reads out the vibration instruction data stored in the buffer area, and thereby the vibration instruction reception section 32 receives the vibration instruction.

The condition information acquisition section 33 acquires information (hereinafter, referred to as condition information) regarding operating conditions of the vibration device 20. The condition information is information indicating the operating conditions of the vibration device 20 when the vibration instruction reception section 32 receives a vibration instruction. Further, the condition information is used to correct contents of the vibration instruction by the after-mentioned vibration control section 34. For example, the condition information acquisition section 33 may acquire information detected by the sensors 22 of the vibration device 20 as the condition information at an interval of a fixed time. Specific examples of contents of the condition information will be described below.

The vibration control section 34 outputs a control command for operating the vibration mechanism 21 to the vibration device 20 on the basis of the contents of the vibration instruction received by the vibration instruction reception section 32. The vibration device 20 generates a strength or vibration of frequency appropriate to the contents of the vibration instruction by operating the vibration mechanism 21 on the basis of the control command. Thereby, a body of the vibration device 20 can be vibrated in accordance with conditions of a game etc. executed by the application execution section 31 according to the present embodiment and vibration thereof can be presented to the user.

Further, in the present embodiment, the vibration control section 34 corrects the contents of the vibration instruction on the basis of the condition information acquired by the condition information acquisition section 33 and outputs the control command for operating the vibration mechanism 21 in accordance with the corrected contents to the vibration device 20. The correction process as described above is performed in order to absorb a change in a vibration characteristic generated depending on the operating conditions of the vibration device 20. Hereinafter, the condition information and specific examples of the correction process in accordance with contents thereof will be described.

Figure 3:
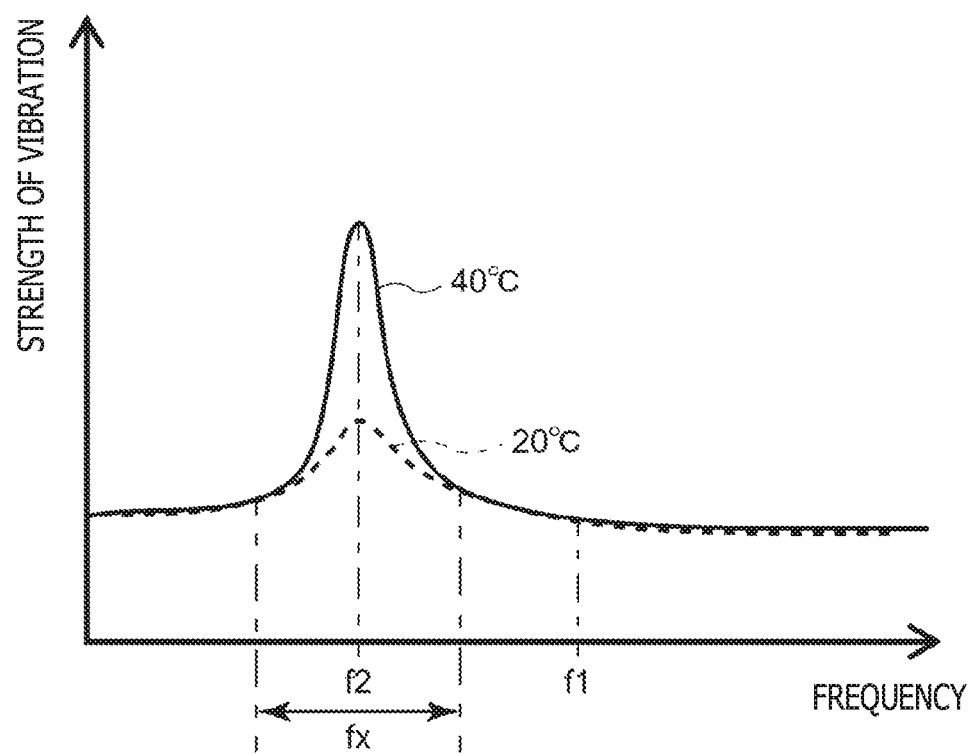
FIG. 3 is a diagram illustrating one example of contents of temperature characteristic information.

First, as a first example, the correction process corresponding to a temperature change of the vibration device 20 will be described. A temperature of the inside rises up when using the vibration device 20. When a temperature rises up, the vibration characteristic of the vibration mechanism 21 may change, for example, an elasticity of a damper that is inside the vibration device 20 changes. FIG. 3 is a graph illustrating one example of a change in the vibration characteristic depending on a temperature. In the graph, a horizontal axis indicates a frequency of the vibration and a vertical axis indicates a strength of the vibration (vibration level) generated by the vibration device 20 to a given reference input voltage. Here, for example, in the case in which a control command for vibrating the vibration device 20 in a single frequency and the reference input voltage is input to the vibration mechanism 21, the strength of the vibration is defined by acceleration etc. of the vibration generated by the vibration device 20. Further, a broken line illustrated in FIG. 3 indicates the vibration characteristic when a temperature in the vibration device 20 is 20° C. and a solid line indicates the vibration characteristic when a temperature in the vibration device 20 is 40° C. As illustrated in FIG. 3, when a temperature changes, the vibration characteristic of the vibration device 20 changes.

In the example, the vibration control apparatus 10 is assumed to previously store information indicating how the vibration characteristic of the vibration device 20 changes in accordance with a temperature in the storage section 12. Hereinafter, information regarding the temperature change of the vibration characteristic stored in the vibration control apparatus 10 is referred to as temperature characteristic information. The temperature characteristic information may be information obtained by actually measuring the vibration characteristic of the vibration device 20 under a plurality of temperature surroundings by a manufacturer of the vibration device 20. For example, the temperature characteristic information is assumed to be information obtained as a result of measuring the vibration characteristic of the vibration device 20 as a sample at a reference temperature (for example, 20° C.) and a temperature changed from the reference temperature by a predetermined temperature (for example, 10° C.). Here, the reference temperature is a temperature within the vibration device 20 under a normal use environment. The temperature characteristic information may be information indicating a frequency dependence characteristic of the strength of the vibration at each temperature as illustrated in FIG. 3.

In the example, the condition information acquisition section 33 acquires information (temperature information) regarding a present temperature of the vibration device 20 as the condition information. The temperature information may be a value actually obtained by measuring a temperature within the vibration device 20 by using the temperature sensor. In this case, the vibration control section 34 estimates the vibration characteristic of the vibration device 20 at the present moment by using the temperature information obtained by the condition information acquisition section 33 and the temperature characteristic information. Then, the vibration control section 34 corrects contents of the vibration instruction so as to approximate the vibration characteristic to the vibration characteristic at the reference temperature. In the case of the vibration device 20 having the temperature characteristic information illustrated in an example of FIG. 3, when a temperature of the inside is 40° C., the strength of the vibration is assumed to become strong in a frequency band fx when compared to the reference temperature. Consequently, the vibration control section 34 performs correction for weakening vibration of the frequency band fx among vibration waveforms included in the vibration instruction data. At this time, a correction amount to the strength of the vibration is determined in accordance with a difference between the strength of the vibration at the present temperature indicated in the temperature characteristic information and the strength of the vibration at the reference temperature. Thereby, the strength of the vibration by the vibration device 20 can be approximated to that at the reference temperature.

Note that the temperature characteristic information in the above examples is assumed to be information indicating the vibration characteristic at each of a plurality of temperatures such as 20° C., 30° C., and 40° C. In a state in which temperatures of the vibration device 20 are not matched with the above temperatures, the vibration control section 34 may determine correction contents by using the vibration characteristic of the temperature closest to the above temperatures. Alternatively, the vibration control section 34 may estimate the vibration characteristic at the present temperature by an interpolation process and determine the correction contents on the basis of estimation results thereof. For example, in the case in which temperature information such that a temperature of the vibration device 20 is 35° C. is obtained, it is only required to estimate that the vibration characteristic is present in an intermediate state between the vibration characteristic at 30° C. and the vibration characteristic at 40° C., and then it is only required to execute the correction process.

Further, in the above description, the temperature sensor is assumed to be included in the sensors 22 and the condition information acquisition section 33 is assumed to acquire a measurement value itself of the temperature sensor as the temperature information. However, not limited thereto, the condition information acquisition section 33 may be assumed to estimate a temperature of the vibration device 20 without performing a direct measurement.

Specifically, for example, the condition information acquisition section 33 may acquire an operation time of the vibration mechanism 21 as the condition information in place of detection results of the temperature sensor. Generally, it is assumed that in the case in which the vibration mechanism 21 is operated over an extended time period, a temperature of the vibration device 20 rises up gradually. Therefore, the condition information acquisition section 33 measures a time in which the vibration mechanism 21 is operated by the vibration instruction from a start of using the vibration device 20 and estimates the present temperature on the basis of the operation time. The vibration control section 34 executes the correction process by using the information regarding the temperature estimated from the operation time in place of the detection results of the temperature sensor. In accordance with the above method, the vibration device 20 can execute the correction process corresponding to the temperature change even if the temperature sensor is not included.

Further, the condition information acquisition section 33 may measure power input to the vibration mechanism 21 by the vibration instruction from the start of using the vibration device 20 in place of the operation time of the vibration mechanism 21 and estimate the present temperature on the basis of a total value of the input power. Similarly to a case of the operation time, the vibration control section 34 executes the correction process by using the information regarding the temperature estimated from the input power. In the case in which larger power is input, the vibration mechanism 21 is assumed to generate more heat. Therefore, the input power is used to thereby estimate the temperature with higher accuracy.

Next, as a second example of the correction process, the correction process according to a temporal change of the vibration device 20 will be described. In the above-described first example, the correction process is assumed to be performed in accordance with the temperature change while using the vibration device 20 once. Apart from such a change while using the vibration device 20 once, it is assumed that the vibration characteristic of the vibration mechanism 21 changes gradually when a long period has passed from a shipping time point. Consequently, the correction process is executed in consideration of an influence on the vibration characteristic due to such a temporal change. Thereby, even after the temporal change occurs, it is possible to vibrate the vibration device 20 in the vibration characteristic close to that at the shipping time point.

In the second example, the condition information acquisition section 33 acquires information (period information) regarding a service period of the vibration device 20 reckoned up from a reference time point. Here, the reference time point is a time point as a starting point of reckoning the period information and may be the shipping time point of the vibration device 20, for example. Specifically, for example, whenever the vibration mechanism 21 is operated, the condition information acquisition section 33 may measure the operation time and record a cumulative value thereof. Alternatively, the condition information acquisition section 33 may measure power input to the vibration mechanism 21 and record the cumulative value. The operation time or input power accumulated from the shipping time point obtained as described above is used as the period information.

The vibration control section 34 uses the period information acquired by the condition information acquisition section 33 and corrects contents of the vibration instruction. Specifically, similarly to the first example, in the case in which the vibration device 20 is used over long periods, information (hereinafter, referred to as period characteristic information) indicating the change in the vibration characteristic is assumed to be previously stored in the storage section 12. The period characteristic information may be information indicating how much the vibration characteristic changes in accordance with the service period. Further, the period characteristic information may be information obtained by previously performing an aging test etc. by the manufacturer of the vibration device 20. The vibration control section 34 uses the period information acquired by the condition information acquisition section 33 and the period characteristic information, and corrects the strength of the vibration included in the vibration instruction data. The process permits the vibration device 20 to be vibrated in the vibration characteristic close to that at the shipping time point.

Note, however, that, in the period characteristic information obtained by performing such a preliminary test, the change in the vibration characteristic is predicted in the case in which the normal vibration device 20 continues to be used under the normal use environment. Therefore, in the case in which the individual vibration device 20 is actually used over the long period, the change in the vibration characteristic may be shifted to that indicated by the period characteristic information. Therefore, the vibration control apparatus 10 may execute a calibration process at predetermined timing and use information obtained in the result as new period characteristic information. For example, the vibration control apparatus 10 persuades the user to execute the calibration process at timing etc. in which the operation time of the vibration mechanism 21 or the input power reaches a predetermined value.

The calibration process is a process in which the vibration mechanism 21 is actually operated and a strength of generated vibration is measured in a state in which the vibration device 20 is placed on a special board, desk, or the like. In the present embodiment, the vibration device 20 is assumed to house the acceleration sensor. Detection results of the acceleration sensor are used to thereby measure a strength of actually generated vibration. When the calibration process is specifically executed, the vibration control section 34 inputs a control command for generating sinusoidal vibration at the reference input voltage to the vibration device 20 while continuously (or stepwise by a predetermined pitch width) changing frequencies. The strength of the vibration correspondingly generated in each of a plurality of frequencies is measured at this time to thereby obtain the vibration characteristic information indicating a relationship between a frequency and the strength of the vibration in the same manner as in that illustrated in FIG. 3. The vibration control section 34 associates the thus obtained vibration characteristic information with the period information (cumulative operation time or input power) at the time point and stores it in the storage section 12. In the case in which the correction process using the period information is performed afterwards, the vibration control section 34 uses the vibration characteristic information stored by the calibration process as the period characteristic information. Thereby, the correction process on which an actual temporal change of the vibration device 20 is reflected can be implemented.

Note that the vibration control section 34 may execute the calibration process in a state in which the user holds the vibration device 20. However, in this case, the strength of the vibration changes depending on a strength etc. in which the user grips the vibration device 20. Therefore, it is necessary to execute the calibration process in consideration of an influence thereof. A specific example of the calibration process in this case will be described below.

Next, as a third example of the correction process, the correction process according to a holding state of the vibration device 20 will be described. In the case in which the user grips and holds the vibration device 20 by hand, the vibration device 20 is gripped strongly or lightly depending on a person or a situation. Specifically, how to hold the vibration device 20 by the user is not fixed. The vibration characteristic of the vibration device 20 or how the user feels the vibration changes depending on a difference in how to hold the vibration device 20. Consequently, it is assumed that the vibration control section 34 performs the correction process in accordance with the present holding state (specifically, how the user holds the vibration device 20) of the vibration device 20. Thereby, even if the user holds the vibration device 20 in any mode, the user can feel similar vibration.

Figure 4:
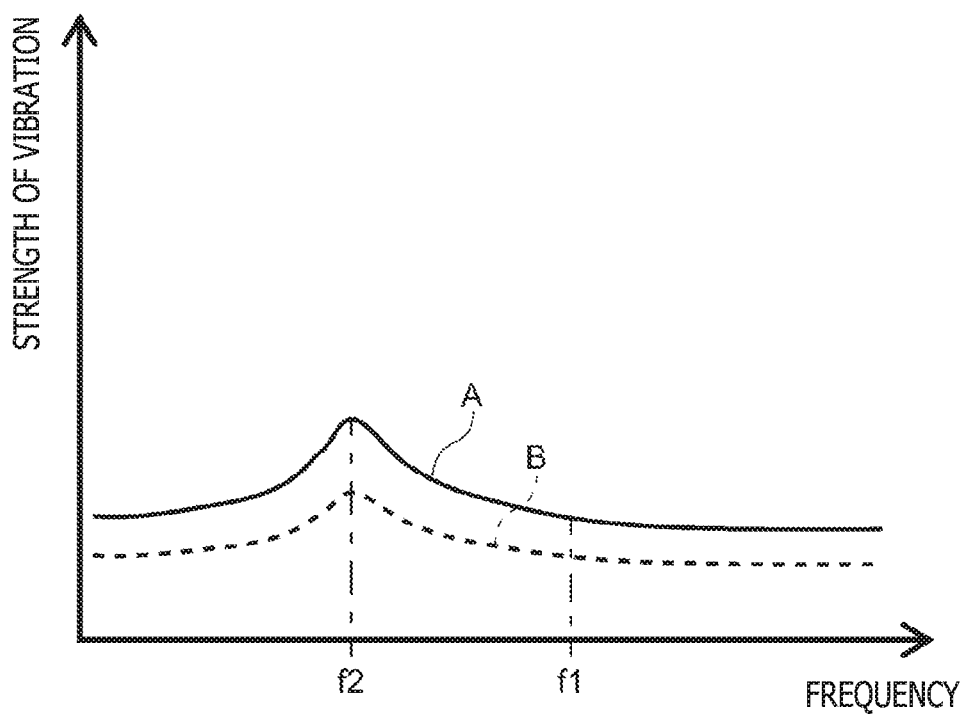
FIG. 4 is a diagram illustrating one example of contents of holding state characteristic information.

Specifically, the vibration control apparatus 10 measures the vibration characteristic of the vibration device 20 in the state in which the user previously grips the vibration device 20 by using a plurality of types of gripping ways. The measurement may be executed similarly to the above-described calibration process. First, the vibration control apparatus 10 persuades the user to lightly grip the vibration device 20, operates the vibration mechanism 21 in the state in which the user lightly grips the vibration device 20 in accordance with the above, and measures a strength of the generated vibration. Next, the vibration control apparatus 10 persuades the user to strongly grip the vibration device 20, operates the vibration mechanism 21 in the state in which the user strongly grips the vibration device 20 in accordance with the above, and measures a strength of the generated vibration. Thereby, the vibration characteristic information indicating a relationship between frequencies and a strength of the vibrations can be obtained regarding each of two types of gripping ways. FIG. 4 illustrates a specific example of two types of the vibration characteristic information as described above. In FIG. 4, a solid line (sign A) indicates the vibration characteristic in the case of lightly gripping the vibration device 20 and a broken line (sign B) indicates the vibration characteristic in the case of strongly gripping the vibration device 20. As illustrated in FIG. 4, when the user strongly grips the vibration device 20, a strength of the generated vibrations becomes weak in any frequency in comparison to a case of lightly gripping the vibration device 20. The vibration control apparatus 10 stores a plurality of types of vibration characteristic information (hereinafter, referred to as holding state characteristic information) obtained as described above in the storage section 12. Note that, here, two types of vibration characteristic information regarding the holding state are assumed to be stored in the storage section 12. Further, three types or more of vibration characteristics regarding the holding state are measured and results thereof may be stored as the holding state characteristic information.

When the vibration is actually presented, the condition information acquisition section 33 acquires, as the condition information, the information (holding state information) regarding the holding state of the vibration device 20 by the user at the time point. Specifically, for example, the condition information acquisition section 33 specifies the holding state of the user by using the detection results of the sensors installed on a surface of the vibration device 20. In this case, sensors are assumed to be installed on a surface of the vibration device 20, for example, a distance sensor that detects a distance up to positions of fingers of the user, a pressure-sensitive sensor that detects pressure applied to a surface of a grip section, and the like. By using the detection results of the sensors, it is possible for the condition information acquisition section 33 to specify the holding state of the user.

Alternatively, the condition information acquisition section 33 may measure a strength of the vibration when actually operating the vibration mechanism 21 by using the acceleration sensor and specify the holding state by using measurement results thereof. In this case, the vibration control section 34 does not perform correction regarding the holding state at timing in which the vibration instruction is first received, but directly vibrates the vibration mechanism 21. Then, the condition information acquisition section 33 measures a strength of the vibration generated by the vibration device 20 in accordance with the vibration instruction by using the acceleration sensor. Further, the vibration instruction reception section 33 compares a strength of the measured vibration with the holding state information, and thereby estimates the present holding state. For example, when the strength of the measured vibration is close to a strength of the vibration in the case of strongly gripping the vibration device 20 in two vibration characteristics exemplified in FIG. 4, it is possible to estimate that the user strongly grips the vibration device 20. The estimation results are used for the correction process when performing the next vibration instruction as the holding state information. Note that the condition information acquisition section 33 may estimate how strong the vibration device 20 is gripped and acquire the estimation results as the holding state information in place of information regarding two values whether the vibration device 20 is just gripped strongly or lightly.

The vibration control section 34 determines the correction contents by using the holding state information and the holding state characteristic information similarly to the first and second examples described above. For example, in the case in which information indicating that the user strongly grips the vibration device 20 is obtained as the holding state information, it is estimated that the vibration characteristic of the vibration device 20 is as indicated by a broken line illustrated in FIG. 4. The vibration control section 34 determines contents of the correction process so as to approximate the vibration characteristic to a targeted vibration characteristic. Here, the targeted vibration characteristic may be previously determined to be a normal vibration characteristic. Alternatively, the targeted vibration characteristic may be the vibration characteristic in a particular holding state (for example, a state in which the user lightly grips the vibration device 20 or a state in which the user does not hold the vibration device 20).

Further, the vibration control section 34 may change the targeted vibration characteristic itself in accordance with the holding state. Even if vibration of the same strength is generated, how the user feels the vibration differs depending on a strength in which the user grips the vibration device 20. Therefore, for example, in the case in which the user lightly grips the vibration device 20, the vibration control section 34 may strengthen a targeted strength itself of the vibration in comparison with a case in which the user strongly grips the vibration device 20.

Further, the vibration control section 34 may change not only a strength of the entire vibrations but also a strength of the vibration in each frequency in accordance with the holding state information indicating how strong the user grips the vibration device 20. Specifically, the user may feel titillating due to high-frequency vibrations depending on the strength in which the user grips the vibration device 20. Particularly, in the case in which the user strongly grips the vibration device 20, the above problem is hard to present. By contrast, in the case in which the user grips the vibration device 20 relatively lightly, a degree in which the user feels titillating due to the high-frequency vibrations becomes high.

In the case in which it is determined that the user lightly grips the vibration device 20 with reference to the holding state information, the vibration control section 34 performs correction such that a generated high-frequency component of the vibration is weakened. Specifically, the vibration control section 34 may set a targeted value of the vibration characteristic to a small value in a frequency band larger than a predetermined threshold frequency. Alternatively, the vibration control section 34 may perform correction such that a strength of the vibration in the frequency band larger than the predetermined threshold frequency is made small in a predetermined rate. The above compression can control a tickling sensation to occur from the high-frequency component.

Note that in the case in which the condition information acquisition section 33 can acquire the holding state information indicating how strong the user grips the vibration device 20, the vibration control section 34 may change the correction contents in accordance with a strength of the gripping. Specifically, the vibration control section 34 is assumed to stepwise change the correction contents so that as the strength of the gripping is smaller, the high frequency vibrations are more weakened.

In the case in which the condition information acquisition section 33 specifies that the user does not hold the vibration device 20, the vibration control section 34 may stop the vibration itself from being generated. The reason is that when the user does not hold the vibration device 20, the vibration cannot be transferred to the user. Further, in the case in which measurement results of the acceleration sensor acquired by the condition information acquisition section 33 are deviated from a range of acceleration that is assumed to occur due to operations of the vibration mechanism 21, it is considered that some sort of abnormality occurs, for example, the vibration mechanism 21 gets out of order. In such a case, the vibration control apparatus 10 may notify the user that the abnormality occurs or stop vibration control. Further, the estimation results of the holding state by the condition information acquisition section 33 may be used for not only the correction process of the vibration instruction by the vibration control section 34 but also a process executed by the application execution section 31.

Further, in the case in which a plurality of users use the vibration devices 20, the condition information acquisition section 33 may record a history of the holding state information specified for each user. By using history information, information indicating a tendency such that how each user grips the vibration device 20 can be acquired. Even if the condition information acquisition section 33 does not specify an actual holding state whenever the vibration mechanism 21 is operated, the vibration control section 34 can execute the correction process on the basis of an assumption that the user holds the vibration device 20 in the same strength as usual, with reference to such tendency information.

Next, as a fourth example of the correction process, the correction process according to a voice signal input to a microphone will be described. In this example, the vibration device 20 is assumed to include a microphone as one of the sensors 22. The microphone is used to collect voices of the user when a voice chat is performed between the user and other users. Here, there is a possibility that when the user operates the vibration mechanism 21 during an input of voices, voices are prevented from being collected or a harmful influence is exerted on an accuracy of voice recognition. Consequently, contents of the vibration instruction are corrected in such a case and thereby such a problem can be avoided.

Specifically, the condition information acquisition section 33 determines whether or not a human voice is included in a voice signal input to the microphone and acquires determination results as the condition information. If it is determined that the human voice is input to the microphone, the vibration control section 34 corrects contents of the vibration instruction. Specifically, the vibration control section 34 may perform correction for totally weakening the strength of the vibration. Further, the vibration control section 34 may perform correction for weakening the strength of the vibration in a frequency band overlapping with a frequency band of a human voice.

Next, as a fifth example of the correction process, the correction process according to acceleration will be described. In this example, the condition information acquisition section 33 acquires information regarding a direction of acceleration applied to the vibration device 20. Particularly, the user holds the vibration device 20 in any direction, and thereby a direction of gravity acceleration applied to the vibration device 20 changes. Further, the condition information acquisition section 33 uses the detection results by the sensors 22 such as the acceleration sensor housed in the vibration device 20 and specifies the direction of the gravity acceleration applied to the vibration device 20.

Figure 5:
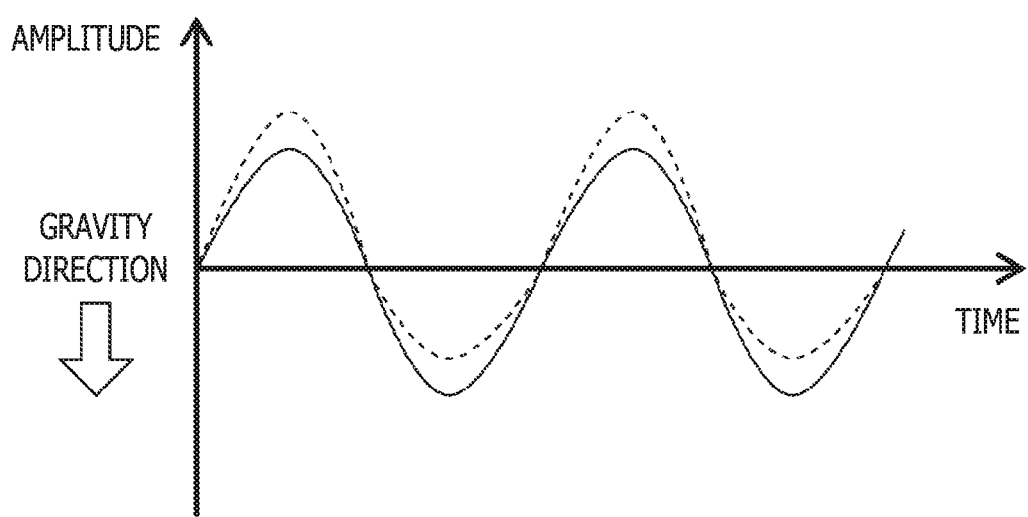
FIG. 5 is a diagram illustrating one example of correction contents of a vibration waveform according to acceleration.

The vibration control section 34 corrects amplitude of the vibration waveform in accordance with the direction of the gravity acceleration. Specifically, when a weight housed in the vibration mechanism 21 is operated in the same direction as a direction of gravity, the vibration control section 34 performs correction for making the amplitude small. The reason is that the weight housed in the vibration mechanism 21 receives an influence of gravity and the vibration to the gravity direction is strengthened. Further, when the weight is operated in a direction opposite to the gravity direction, the vibration control section 34 may enlarge the amplitude. FIG. 5 is a diagram illustrating one example of the correction according to the gravity acceleration. A solid line illustrated in FIG. 5 indicates a vibration waveform before the correction and a broken line illustrated in FIG. 5 indicates a vibration waveform after the correction. Here, it is assumed that a downward direction of a paper sheet is matched with the gravity direction.

Note that the vibration control section 34 may change the correction amount in accordance with a size of acceleration along with the vibration direction. Even in the case in which the vibration direction is not completely matched with the gravity direction, the weight in the vibration mechanism 21 receives an influence due to gravity in accordance with a direction thereof. Therefore, the condition information acquisition section 33 may calculate a size along with the vibration direction of the gravity acceleration and the vibration control section 34 may perform correction of the vibration waveform in the correction amount determined in accordance with a size thereof. Specifically, as the vibration direction is closer to the gravity direction, the vibration control section 34 makes the correction amount larger. By contrast, as an angle formed between the vibration direction and the gravity direction becomes larger, the vibration control section 34 makes the correction amount smaller. The process permits an influence of gravity to be reduced.

Next, as a sixth example of the correction process, the correction process in consideration of power consumption will be described. The example differs from past examples and the vibration control section 34 executes the correction process for suppressing power consumption. When the frequency for operating the vibration mechanism 21 is high, the power consumption of the vibration device 20 may become large and a remaining capacity of a built-in battery of the vibration device 20 may run down earlier than an originally assumed standard usage time. To avoid such a state, the vibration control section 34 executes the correction process for suppressing a power consumption amount in the case in which a consumption pace of power is fast.

Specifically, the condition information acquisition section 33 acquires, as the condition information, information indicating an elapsed time from a use start time of the vibration device 20 and information regarding the past power consumption. Examples of information regarding the power consumption may include information indicating the remaining amount of the battery and information indicating the operation time or input power of the vibration mechanism 21 from the use start time similarly to the first example. How much the vibration device 20 consumes power in the past can be estimated on the basis of the above information.

In the case in which a comparison is made between the elapsed time and power consumption amount obtained by the condition information acquisition section 33 and it is determined that the consumption pace of power is faster than that of standards, the vibration control section 34 performs the correction process for suppressing power consumption on the vibration instruction data. Specifically, the correction process may be correction for weakening the strength of the vibration. Note that the vibration control section 34 may perform correction for reducing a level of the entire vibration waveform. Further, the vibration control section 34 may perform correction for weakening only the vibration of a particular frequency band (for example, a frequency band other than a frequency band close to a resonant frequency). Further, the correction amount in the correction process may be changed in accordance with a size of the past power consumption amount. Specifically, as the power consumption amount is larger than that of the assumption, the correction amount is made larger. By performing the above correction process, the vibration device 20 continues to be capable of being used up to the targeted elapsed time while suppressing the power consumption pace of the vibration device 20.

Note that the vibration control section 34 may execute a plurality of types of correction processes as described above in combination therewith. In this case, the condition information acquisition section 33 acquires a plurality of types of condition information and the vibration control section 34 executes the correction process according to each of the above condition information on a piece of correction instruction data.

Figure 6:
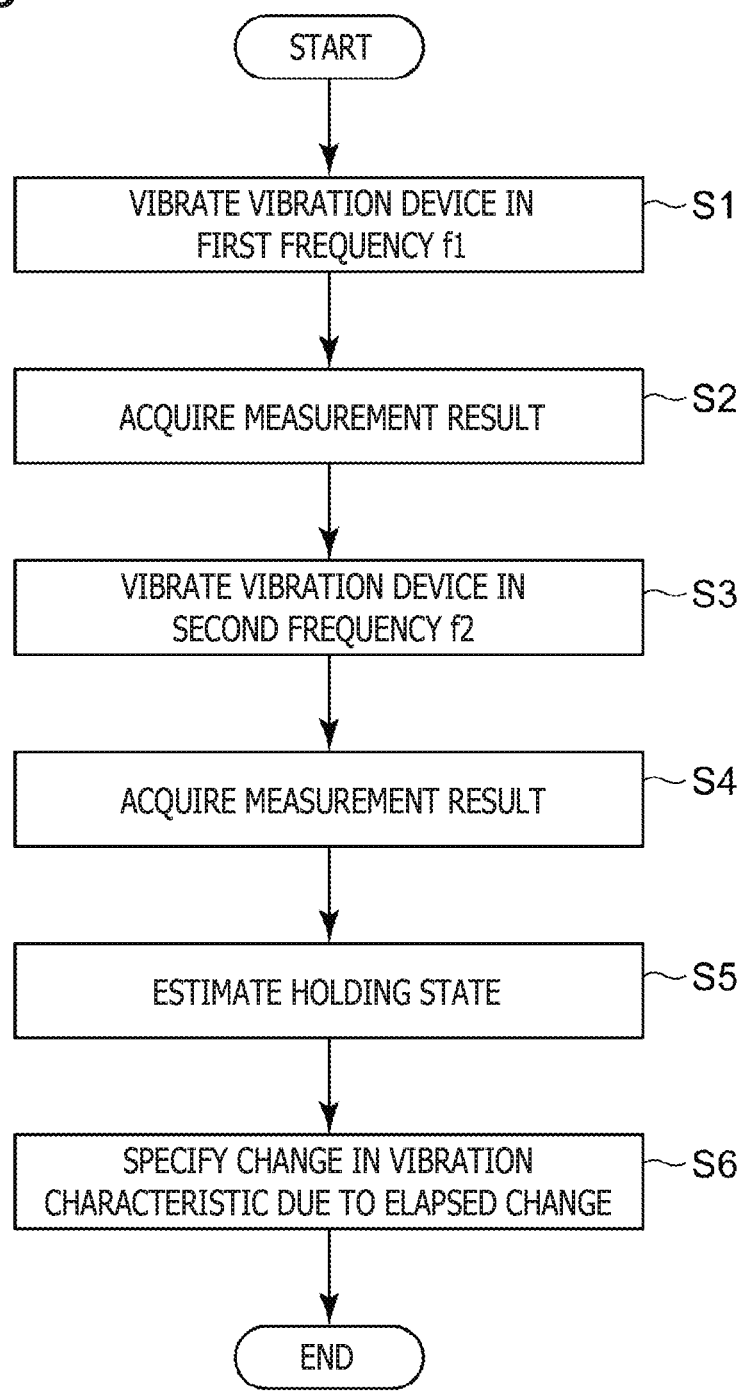
FIG. 6 is a diagram illustrating one example of a stream of a calibration process.

Here, processing procedures in the case in which the user executes the calibration process in the state of holding the vibration device 20 will be described. As described above, the strength of the vibration generated by the vibration mechanism 21 receives an influence in accordance with the holding state by the user. Therefore, it is difficult to directly measure only the change in the vibration characteristic generated by the temporal change in the state in which the user holds the vibration device 20. To solve the above problem, the vibration control section 34 may execute the calibration process by the procedures as illustrated in FIG. 6.

First, the vibration control section 34 vibrates the vibration device 20 in a first frequency f1 (step S1). Then, the vibration control section 34 acquires measurement results of the acceleration sensor in which the strength of the vibration is indicated (step S2). Here, the first frequency f1 is a previously determined frequency and is a frequency separated from the resonant frequency (frequency in which the strength of the vibration becomes strongest) of the vibration device 20.

Next, the vibration control section 34 vibrates the vibration device 20 in a second frequency f2 (step S3). Then, the vibration control section 34 acquires measurement results of the acceleration sensor in which the strength of the vibration is indicated (step S4). The second frequency f2 may be the resonant frequency itself or a frequency close to the resonant frequency.

The change in the vibration characteristic due to the temporal change is assumed to be strongly indicated close to the resonant frequency similarly to an example of the temperature change illustrated in FIG. 3. By contrast, an influence of the temperature change or the temporal change is assumed to be small in a frequency separated from the resonant frequency. Meanwhile, when the holding state changes, the influence is assumed to be indicated in any frequency as illustrated in FIG. 4. Therefore, an influence due to the holding state is considered to be mainly reflected on the measurement results when the vibration device 20 is vibrated in the first frequency f1 separated from the resonant frequency. Further, influences of both the holding state and the temporal change are considered to be reflected on the measurement results when the vibration device 20 is vibrated in the second frequency f2.

Consequently, the vibration control section 34 estimates the holding state when executing the calibration process on the basis of the measurement results of step S2 (step S5). Similarly to the above-described third example of the correction process, the measurement results are compared with the holding state characteristic information to thereby realize the estimation. Continuously, the vibration control section 34 specifies the change in the vibration characteristic due to the temporal change by using the measurement results of step S4 and the estimation results of step S5 (step S6). Specifically, the vibration control section 34 estimates how much the strength of the vibration is changed in the second frequency f2 due to the holding state by using the estimation results of step S5 and the holding state characteristic information. A change amount due to the holding state is removed from the measurement results of step S4 to thereby calculate a change amount of the vibration characteristic due to the temporal change.

Note that, in the above-described description, each of the first frequency f1 and the second frequency f2 is assumed to be a single frequency and further the measurement results may be used when vibrating the vibration device 20 in each of a plurality of frequencies. The process permits an estimation accuracy to be more improved.

Here, the process at the time of the calibration is described. The change in the vibration characteristic due to the holding state may be specified in the same way even in a normal use of the vibration device 20. In the case of particularly performing an instruction for generating the vibration in a particular frequency separated from the resonant frequency, a deviation between vibration predicted in the frequency and measurement results of actually generated vibration is specified to thereby estimate the holding state at that time point. Therefore, the estimation results of the holding state are used and thereby the vibration control section 34 can execute the correction process in accordance with the holding state similar to the above-described third example. A deviation between a predicted vibration and the measurement results of an actually generated vibration is specified in the case of generating the vibrations in the frequency close to the resonant frequency. Thereby, the change in the vibration characteristic in which the holding state, the temporal change, and the temperature change are generated compositely can be specified. The change amount due to the holding state is removed from the specification results, and thereby the vibration control section 34 can specify the vibration change due to the temporal change and the temperature change and execute the correction process in accordance with the contents.

In accordance with the vibration control system 1 described above according to the present embodiment, the correction process of contents according to operating conditions of the vibration device 20 is executed on the vibration instruction data. Thereby, the user can feel similar vibrations regardless of conditions.

Note that the embodiment of the present invention is not limited to the embodiment described above. In the above description, for example, the vibration device 20 is assumed to be an operation device that receives an operation input of the user, however, the vibration device 20 is not limited to the above operation device. Further, the vibration device 20 may be mainly used for only a presentation of the vibration to the user. Alternatively, the vibration device 20 may be an operation device used for other usages.

Further, at least a portion of the correction process executed by the vibration control section 34 in the above description may be implemented on the side of an application program. In this case, the application execution section 31 corrects a previously prepared vibration waveform on the basis of the condition information acquired by the condition information acquisition section 33. Then, the application execution section 31 outputs the vibration instruction data for vibrating the vibration device 20 with corrected contents. The vibration control section 34 vibrates the vibration device 20 on the basis of the vibration instruction data. Even by the above process, the vibration corrected in accordance with the vibration characteristic of the connected vibration device 20 can be generated.

Further, a plurality of types of vibration waveforms corresponding to the change in the vibration characteristic generated due to the temperature change, the holding state, the temporal change, or the like may be previously prepared in the application program. In this case, with reference to the condition information acquired by the condition information acquisition section 33, the application execution section 31 selects one vibration waveform according to conditions from among a plurality of types of previously prepared vibration waveforms and outputs the vibration instruction data vibrated by the selected vibration waveform. In accordance with the above process, the vibration device 20 can be vibrated in contents according the operating condition without performing the correction process according to the operating condition in real time.

Further, in the above description, it is assumed that a computer separately independent of the vibration device 20 executes the correction process. Further, the correction process according to the operating condition of the vibration device 20 may be executed on the side of the vibration device 20. In this case, the vibration device 20 is assumed to previously store the temperature characteristic information or the period characteristic information in a built-in memory. Then, in the case of receiving the vibration instruction data, the vibration device 20 executes the correction process on contents of the vibration instruction data by using the above characteristic information and measurement results of the sensors 22. Thereby, the computer connected to the vibration device 20 can transmit the vibration instruction data without considering the operating condition of the connected vibration device 20.

REFERENCE SIGNS LIST

1 Vibration control system, 10 Vibration control apparatus, 11 Control section, 12 Storage section, 13 Communication section, 14 Display apparatus, 20 Vibration device, 21 Vibration mechanism, 22 Sensor, 31 Application execution section, 32 Vibration instruction reception section, 33 Condition information acquisition section, 34 Vibration control section

The invention claimed is:

1. A vibration control apparatus that vibrates a vibration device, comprising:
    an acquisition section configured to acquire information regarding an operating condition of the vibration device;
    a vibration instruction reception section configured to receive a vibration instruction; and
    a vibration control section configured to vibrate the vibration device according to content in which content of the received vibration instruction is corrected in accordance with the information regarding the operating condition, wherein:
    the information regarding the operating condition includes information regarding a holding state including a plurality of previous measurements of variations in strength that the user grips the vibration device,
    the vibration control section corrects the change in the vibration characteristic due to the holding state of the vibration device.

2. The vibration control apparatus according to claim 1, wherein
    the information regarding the operating condition includes information indicating a direction of gravity applied to the vibration device, and
    the vibration control section corrects a strength of the vibration in accordance with a relationship between the direction of gravity and a direction of the vibration according to the vibration instruction.

3. The vibration control apparatus according to claim 1, wherein
    the information regarding the operating condition includes information indicating a service period of the vibration device from a reference time point up to a current time point, and
    the vibration control section corrects a change in a vibration characteristic of the vibration device estimated to be generated during the service period.

4. The vibration control apparatus according to claim 3, wherein
    the acquisition section acquires a measurement result of the strength of the vibration generated when the vibration device is vibrated in each of a plurality of frequencies, and
    the vibration control section specifies vibration characteristic information indicating the change in the vibration characteristic of the vibration device during the service period on a basis of the measurement result and performs the correction on the basis of the specified vibration characteristic information.

5. The vibration control apparatus according to claim 4, wherein the vibration control section specifies the holding state of the vibration device by a user on the basis of the measurement result when the vibration device is vibrated in one of the plurality of frequencies and specifies the vibration characteristic information indicating the change in the vibration characteristic of the vibration device during the service period on the basis of the measurement result when the vibration device is vibrated in another of the plurality of frequencies and the specified holding state.

6. The vibration control apparatus according to claim 1, wherein
    the information regarding the operating condition is information regarding a temperature within the vibration device, and
    the vibration control section corrects the change in the vibration characteristic of the vibration device estimated to be generated due to a change in a temperature.

7. The vibration control apparatus according to claim 1, wherein the vibration control section performs correction for weakening a predetermined high-frequency component of a vibration waveform included in the received vibration instruction in accordance with the strength in which the user grips the vibration device.

8. The vibration control apparatus according to claim 1, wherein
    the acquisition section records information regarding the acquired holding state, and
    the vibration control section performs correction according to a tendency of the holding state of the user specified from information regarding the past recorded holding state.

9. The vibration control apparatus according to claim 1, wherein
    the vibration device includes a microphone,
    the information regarding the operating condition includes information indicating a result in which it is determined whether or not a human voice is included in a voice signal input to the microphone, and
    the vibration control section corrects content of the vibration instruction in a case in which it is determined that the human voice is included in the voice signal input to the microphone.

10. The vibration control apparatus according to claim 1, wherein
    the information regarding the operating condition includes information regarding a power consumption amount of the vibration device, and
    the vibration control section performs correction for weakening vibration of a part or all of a frequency band included in the vibration instruction so as to suppress power consumption of the vibration device in accordance with the power consumption amount of the vibration device.

11. A control method for a vibration device, comprising:
acquiring information regarding an operating condition of the vibration device;
receiving a vibration instruction; and
vibrating the vibration device according to content in which content of the received vibration instruction is corrected in accordance with information regarding the operating condition, wherein:
the information regarding the operating condition includes information regarding a holding state including a plurality of previous measurements of variations in strength that the user grips the vibration device,
the vibration control section corrects the change in the vibration characteristic due to the holding state of the vibration device.

12. A non-transitory, computer readable storage medium containing a computer program, which when executed by a computer, causes the computer to control a vibration device by carrying out actions, comprising:
acquiring information regarding an operating condition of the vibration device;
receiving a vibration instruction; and
vibrating the vibration device according to content in which content of the received vibration instruction is corrected in accordance with information regarding the operating condition, wherein:
the information regarding the operating condition includes information regarding a holding state including a plurality of previous measurements of variations in strength that the user grips the vibration device,
the vibration control section corrects the change in the vibration characteristic due to the holding state of the vibration device.

* * * * *